United States Patent [19]
Johansson et al.

[11] Patent Number: 4,712,420
[45] Date of Patent: Dec. 15, 1987

[54] ARRANGEMENT IN A MAGNETIC POSITION INDICATOR

[75] Inventors: Hans Johansson; Anders Göras, both of Amal, Sweden

[73] Assignee: Saab-Scania AB, Sodertalje, Sweden

[21] Appl. No.: 834,567

[22] Filed: Feb. 28, 1986

[30] Foreign Application Priority Data

Feb. 28, 1985 [SE] Sweden .............................. 8500977

[51] Int. Cl.⁴ ..................... G01M 19/00; G01D 5/12
[52] U.S. Cl. ................................. 73/118.1; 335/207; 116/20; 116/204
[58] Field of Search ................... 73/118.1, DIG. 3; 335/205, 206, 207, 137, 179; 116/DIG. 20, DIG. 21, 204, 20; 200/56 R, 61.88; 74/471 XY, 473 R; 324/173, 174, 208

[56] References Cited

U.S. PATENT DOCUMENTS

| | | |
|---|---|---|
| 3,133,173 | 5/1964 | Vreins ................................. 335/207 |
| 4,066,962 | 1/1978 | Jaffe . |
| 4,262,251 | 4/1981 | Fujishiro et al. . |
| 4,519,266 | 5/1985 | Reinecke ............................. 335/207 |
| 4,543,843 | 10/1985 | Reynolds et al. ................. 74/473 R |
| 4,543,844 | 10/1985 | Inui et al. .......................... 74/473 R |
| 4,554,422 | 11/1985 | Embrey et al. ..................... 335/206 |
| 4,590,817 | 5/1986 | Bennett .............................. 74/473 R |

FOREIGN PATENT DOCUMENTS

| | | |
|---|---|---|
| 2147516 | 9/1971 | Fed. Rep. of Germany . |
| 2531517 | 7/1975 | Fed. Rep. of Germany . |
| 2537714 | 8/1975 | Fed. Rep. of Germany . |
| 3208721 | 3/1982 | Fed. Rep. of Germany . |
| 1136700 | 8/1967 | United Kingdom . |
| 2091423 | 7/1982 | United Kingdom ................ 324/208 |

Primary Examiner—Stewart J. Levy
Assistant Examiner—Robert R. Raevis
Attorney, Agent, or Firm—Cushman, Darby & Cushman

[57] ABSTRACT

Apparatus for sensing the relative position between a fixed first machine component and an axially displaceable and pivotably mounted second machine component includes first and second bar-shaped magnets disposed at mutually right angles and rigidly connected to the second machine component, each of the magnets having a free pole; and a plurality of transducers rigidly connected to the first machine component and facing the free poles of the magnets for sensing the magnetic field of said magnets. At each long side of each of the first and second magnets an adjacent magnet disposed in parallel with the respective first or second magnet, each of these adjacent magnets having a free pole disposed in the vicinity of the free pole of the respective first or second magnet. The free poles of the first and the second magnets have a polarity reverse to that of the free poles of the adjacent magnets, and each magnet has opposite to its free pole a second pole directed away from the transducers. At least the second poles of the mutually parallel magnets are magnetically connected. The location and the orientation of the magnets causes the extension of the magnetic field at the free poles of the first and second magnets to be restricted.

9 Claims, 5 Drawing Figures

ARRANGEMENT IN A MAGNETIC POSITION INDICATOR

The present invention relates to an arrangement in a magnetic position indicator for sensing the relative positions between a fixed first machine component and an axially displaceably and pivotably mounted second machine component.

In different connections it is known to use magnetic touchless position indicators for sensing the relative positions between different machine components. A usual embodiment of such an indicator includes a permanent magnet attached to one machine component, this magnet being disposed for coacting with a magnetic field-sensing transducer attached to the other machine component. The mutual relative movement of the machine components is sensed by the transducer sensing when the magnetic field strength exceeds a predetermined value.

The magnetic field strength is greatest in the vicinity of the magnet poles, and the magnet and transducer are usually implemented such that the latter sends a signal when one pole of the magnet is in the vicinity of it.

The transducer, sensitive to magnetic fields, is usually of the type using the Hall effect, and it senses both direction and strength of the magnetic field. In such a case, the transducer is oriented primarily to sense magnetic field strength in a direction at right angles to the direction of relative movement of the machine components. The magnet is correspondingly oriented so that the magnetic field around the pole used for sensing also obtains a direction substantially at right angles to the relative movement of the machine components.

In practice however, the magnetic field is relatively spread out, even around the poles of the magnet. The result of this is that prior art arrangements with such position indicators give uncertain position indication. Furthermore, the sensitivity of the tranducers sensitive to magnetic fields may vary, which lessens the accuracy of the position indicator still more. To reduce these disadvantages, it is necessary, in installing the arrangement, to adjust the air gap between magnet and transducer accurately. Even if this is done, the accuracy of the position indicator will be comparatively poor. The consequence of this is that such position indicators cannot be used where good accuracy is required, or where the relative movement of the machine components is small.

The present invention relates to an arrangement in magnetic position indicators which has the object of eliminating the mentioned disadvantages, and enables the implementation of a position indicator that does not require very accurate adjustment of the air gap between the magnet and transducer, but yet has good accuracy. This is achieved by a first and a second magnetic field-generating magnet being rigidly connected to the axially displaceably and pivotably mounted second machine component and transducers sensitive to magnetic fields being rigidly connected to the fixed first machine component, said transducers sensing the magnetic field around the free poles of the magnets.

The invention is thus characterized in that:

the first and second magnets are bar-shaped and disposed mutually at right angles, the first and the second magnet each are surrounded on both their long sides by magnets disposed in parallel and with their respective free poles in the vicinity of the free poles of the first and second magnet, the free poles of the first and second magnet have opposite polarity in relation to that of the free poles of the adjacent magnets and the respective second poles of at least the mutually parallel magnets are magnetically connected, whereby the extension of the magnetic field around the respective free poles of the first and second magnet is restricted.

The inventive arrangement results in that around the magnetic pole where the magnetic field strength is sensed the magnetic field will be directed towards the adjacent magnet pole. The portion of the magnetic field that can affect the transducer will thus be narrower, causing the accuracy of the position indicator to increase. Furthermore, the air gap between magnet and transducer does not need to be adjusted as accurately as with the embodiments of the prior art.

In automotive engineering, it has been found particularly advantageous to utilize the invention for indicating the selected gear in mechanical gearboxes. With fully or semi-automatic control of mechanical gearboxes it is necessary to indicate what gear is engaged. Mechanical switches are known to be used for this purpose. There are large disadvantages with these, since they require accurate adjustment as well as being voluminous and subject to wear, which later brings great need of repeated servicing.

With the inventive arrangement there is afforded the opportunity of arranging accurate gear engagement indication in a gearbox. Application of the arrangement in the gearbox is considerably facilitated at the same time, and the problem of wear is avoided entirely.

Further properties and advantages distinguishing the invention will be understood from the following description of an embodiment of the invention applied to an automotive gearbox.

The description is made with reference to the accompanying drawings, on which:

Figure 1:
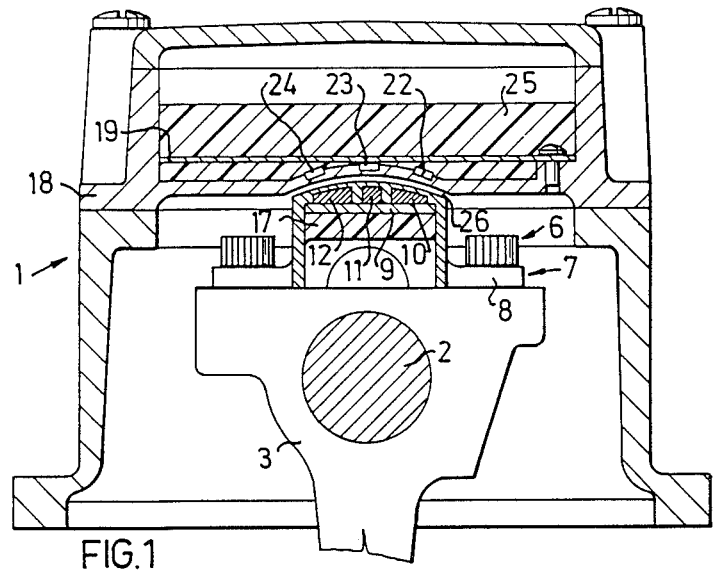
FIG. 1 is a partial section of a gearbox according to B—B in FIG. 4.

The partial cross section in FIG. 1 illustrates a gearbox cover 1 included in an automotive mechanical gearbox. The cover 1 houses a rotatably and axially displaceably mounted selector rod 2, to which is attached a gear selector 3 for engaging a plurality of different gears in the gearbox. This results in different meshing in the gearbox for engaging and disengaging the respective gears. The selector rod 2 is mounted such that it can be moved rotationally and axially. These movements may be controlled in a manner known per se with the aid of a gear change lever operated by the driver, the movements of the lever being transmitted via a link mechanism to the selector rod.

Figure 2:
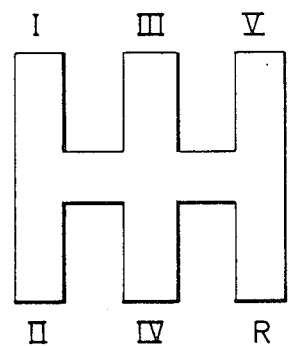
FIG. 2 illustrates the gear-changing pattern for the gearbox.

In the present example, two pressurized medium servo means are utilized for performing the movements of the selector rod 2, one of the servo means controlling the axial movement of the rod and the other servo means controlling its rotary movement. From an axially central neutral position 4 the selector rod may be shifted axially in either direction, and it may also be turned in either direction from a neutral rotational position 5. By combining these movements the selector rod 2 may, apart from the neutral positions 4, 5, assume six different gear positions, these corresponding to the gearbox gear engagements R, I, II, III, IV and V. These gear positions are schematically illustrated in the gear changing pattern of FIG. 2. The axial displacement movements of the selector rod 2 correspond here to the movements of a fictitious point in the transverse direction of the Figure, and the rotational movements of the selector rod to the movements of a fictitious point in the vertical direction of the Figure in a corresponding manner.

A magnet holder 7 is screwed to the gear selector 3 by a plurality of bolts 6. The holder 7 includes an aluminium attachment plate 8 for attachment to the gear selector 3, and a base 9, to which are magnetically attached seven permanent magnets 10-16. The attachment plate 8, base 9 and magnets 10-16 are moulded into, and kept together by a cured plastics material, suitably epoxy plastics. In manufacturing the magnet holder 7 the magnets 10-16 have been magnetized before they were fitted to the base, which is made from soft magnetic material.

The magnets 10-16 are disposed in two groups, the first comprising three magnets 10, 11, 12 oriented to extend in the transverse direction of the rod 2 for the task of sensing the rotational position of the rod. The second group comprises four magnets 13-16, oriented to extend in the axial direction of the rod 2 for the task of sensing the axial position of the rod.

Of the magnets 10-12 in the first group, the middle one 11 has its north pole N towards the base 9, while the other two 10 and 12 have their south poles S towards the base 9. The respective opposing poles of the magnets 10-12 are oriented radially outwards. In the accompanying Figures the south poles of the magnets are denoted S and their north poles N.

The magnets 13-16 in the second group are disposed in a similar manner. A central magnet 14 has its north pole N towards the base 9, while the other magnets 13, 15, 16 have their south poles S towards the base 9. These magnets 13-16 also have their respective opposing poles oriented radially outwards.

A transducer cover 18 is screwed by a plurality of (not illustrated) screws to the gearbox cover 1, and accommodates a circuit board mounted therein. There are five Hall-effect transducers 20-24 mounted on the circuit board 19, each capable of sensing both direction and strength of a magnetic field. The transducers 20-24 and circuit board 19 are secured to the transducer cover 18 with the aid of a cured plastics material 25, suitably epoxy plastics. In relation to the selector rod 2 the transducer cover 18 is oriented so that in a radial direction only a narrow air gap 26 separates the magnets 10-16 from the transducers 20-24.

Figure 3:
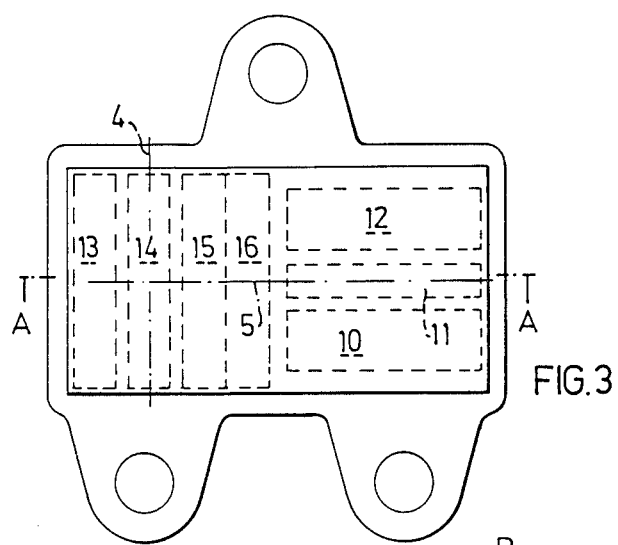
FIG. 3 illustrates a magnet holder attached to the gearbox selector rod.
Figure 4:
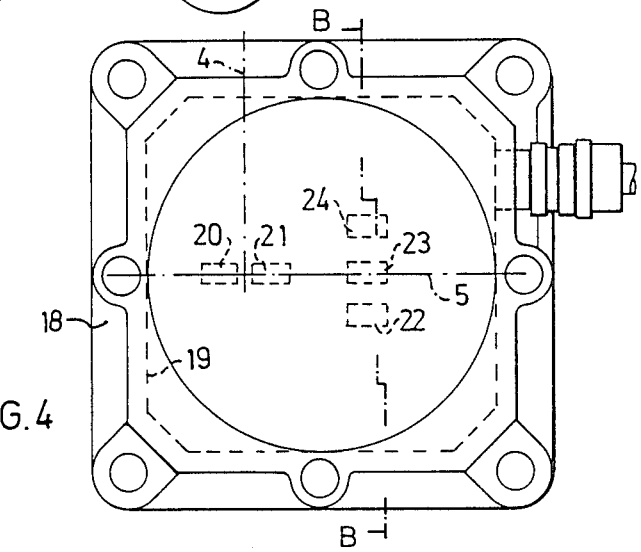
FIG. 4 illustrates a gearbox cover provided with transducers sensitive to magnetic fields.

The orientation of the transducers 20-24 in relation to the magnets 10-16 will be seen from a combination of FIGS. 3 and 4, where the respective neutral positions 4,5 of the selector rod 2 are denoted by chain-dotted lines.

As with the magnets 10-16 the transducers 20-24 are disposed in two groups. A first group includes three transducers 22-24 intended for sensing the rotational position of the selector rod 2. For this purpose these transducers 22-24 are oriented tangentially to the rod. A second group includes two transducers 20-21 intended for sensing the axial position of the rod 2, these transducers being oriented in the axial direction of the rod.

Figure 5:
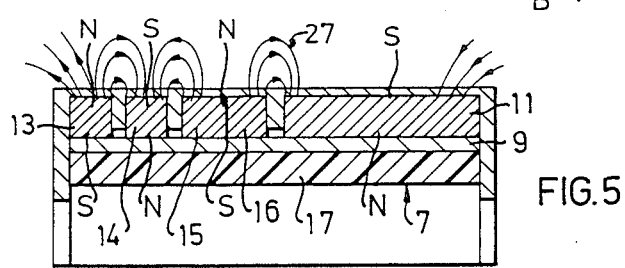
FIG. 5 is an axial cross section according to A—A in FIG. 3.

The transducers 20-24 are oriented so that they are most sensitive to a radially directed magnetic field. Since they can also sense the direction of the magnetic field they are also adapted such that they solely sense magnetic flux directed towards magnetic south poles S. The magnetic field in the vicinity of a magnetic north pole N is directed outwardly from the poles, and in this case will not affect the transducers 20-24. FIG. 5 illustrates the magnets 11,13-16 in an axial cross section according to A—A in FIG. 3. In FIG. 5 the magnetic field is conventionally illustrated by lines of field 27 between the free poles of the magnets 13-16. By inventively arranging the center magnet 14 with its polarity the reverse of that of its two adjacent magnets 13,15 the extension of the magnetic field around the south pole of the magnet 14 is restricted, the field being the one affecting the transducers 20,21. Analogously, the magnetic field around the center magnet 11 is restricted by its adjacent magnets 10,12.

The magnetic field directed towards the respective free pole S of the center magnets 11 and 14 is deflected by the north pole N of the respective adjacent magnets 10,12 and 13,15. The consequence of this is that approximately halfway between a center magnet 11, 14 and an adjacent magnet 10,12,13,15 there is obtained a boundary outside which the magnetic field cannot affect the transducers 20-24. The portion of the magnetic field contiguous to the two free south poles that can affect the transducers 20-24 will therefore have a restricted extension.

Of all seven magnets 10-16, only the two center magnets 11,14 are utilized energizing the transducers 20-24, while the other five magnets 10,12,13,15,16 are utilized for restricting the extension of the magnetic field around the respective center magnets 11,14. The latter may advantageously be made from a material having a strong magnetic field, e.g. a cobalt-samarium alloy. The remaining magnets 10,12,13,15,16 may be made from a simpler and cheaper magnetic material such as ferrite.

In the gearbox neutral position 5 the selector rod 2 assumes a position where the magnet 11 energizes the transducer 23. If the selector rod 2 is turned, which corresponds to a vertical movement in FIG. 3, this means that the magnet 11 will energize the transducer 22 or 24, depending on the direction of rotation of the selector rod 2.

When the selector rod 2 is in its axially central, neutral position 4, the two transducers 20,21 are unenergized by the magnet 14. On axial movement of the rod one or the other of the transducers 20,21 will be energized by the magnet 14, depending on the direction of movement.

By different combinations of signals and the absence thereof from the transducers 20-24, the position of the selector rod 2 may be unambiguously determined, which is utilized to indicate what gear is engaged in the gearbox.

Within the scope of the following claims the invention may be modified and implemented differently from what has been exemplified in the description. For example, one or more of the magnets 10-16 may be integrated with each other, in which case their poles should be oriented as described above. Such an embodiment provides a somewhat cheaper solution, but does not give as good accuracy as when separate magnets are utilized.

We claim:

1. Apparatus for sensing in a gearbox the position of a gear selector rod that is axially displaceably and pivotably mounted in a gearbox housing, said apparatus comprising: a first and a second bar-shaped magnet disposed at mutually right angles and rigidly connected to said selector rod, each of said magnets having a long side and a free pole; a plurality of transducers rigidly connected to the gearbox housing and facing the free poles of said magnets for sensing the magnetic field of said magnets; at each long side of each of said first and second magnets and adjacent magnet disposed in parallel with the respective first or second magnet, each of said adjacent magnets having a free pole disposed in the vicinity of the free pole of the respective first or second magnet, the free poles of the first and the second magnets having a polarity reverse to that of the free poles of the adjacent magnets, each magnet having opposite to its free pole a second pole directed away from the transducers, at least the second poles of the mutually parallel magnets being magnetically connected, whereby the strength of the magnetic field facing the transducers is increased by the reduction in magnetic resistance attributable to said adjacent magnets.

2. Apparatus as in claim 1, wherein each magnet is a permanent magnet, and all magnets are magnetically connected via a magnetically conductive base.

3. Apparatus as in claim 2, wherein said first magnet is symmetrically surrounded by at least two adjacent magnets.

4. Apparatus as in claim 3 wherein the free pole of the first magnet extends in the axial direction of the selector rod, and the free pole of the second magnet extends in a direction transverse to the longitudinal direction of the selector rod.

5. Apparatus as in claim 4, wherein all of the transducers are Hall effect transducers which sense the magnitude of a magnetic field in a given direction.

6. Apparatus as in claim 5, said Hall effect transducers being disposed mutually apart on the gearbox housing for indicating a plurality of positions of the selector shaft, said positions representing different gears selected.

7. Apparatus as in claim 6, all of the magnets being rigidly connected to the selector rod, and the transducers being rigidly connected to a cover of the gearbox housing.

8. Apparatus as in claim 7, wherein all of said magnets are disposed on a common magnet holder attached to the selector rod, said magnets being disposed in a first and a second group, and also the transducers being disposed in a first and a second group, the first group of magnets and the first group of transducers being utilized for axial position indication of the selector rod, and the second group of the magnets and the second group of the transducers being utilized for rotational position indication of the selector rod.

9. Apparatus for sensing the relative position between a fixed first machine component and an axially displaceably and pivotably mounted second machine component, comprising: a first and a second bar-shaped magnet disposed at mutually right angles and rigidly connected to said second machine component, each of said magnets having a long side and a free pole; a plurality of transducers rigidly connected to the first machine component and facing the free poles of said magnets, for sensing the magnetic field of said magnets; at each long side of each of said first and second magnets an adjacent magnet disposed in parallel with the respective first or second magnet, each of said adjacent magnets having a free pole disposed in the vicinity of the free pole of the respective first or second magnet; the free poles of the first and the second magnets having a polarity reverse to that of the free poles of the adjacent magnets, each magnet having opposite to its free pole a second pole directed away from the transducers, at least the second poles of the mutually parallel magnets being magnetically connected, and the location and the orientation of the magnets causing the extension of the magnetic field at the free poles of the first and second magnets to be restricted.

* * * * *